Patented Dec. 29, 1925.

1,567,396

UNITED STATES PATENT OFFICE.

EPHRAIM D. SCHWALM, OF CHICAGO, ILLINOIS.

SOLDERING ALLOY AND METHOD OF MAKING THE SAME.

No Drawing.     Application filed April 29, 1925. Serial No. 26,805.

*To all whom it may concern:*

Be it known that I, EPHRAIM D. SCHWALM, a citizen of the United States, residing at Chicago, in the county of Cook and State of Illinois, have invented certain new and useful Improvements in a Soldering Alloy and Method of Making the Same, of which the following is a specification.

My invention relates to a new and useful improvement in a soldering alloy and the method of making the same, and has for its object to produce a solder for brazing or uniting pieces of aluminum or aluminum alloy or other metals in a strong and durable manner.

Heretofore attempts have been made to produce a solder for brazing or uniting pieces of aluminum or other metals but the soldering alloy resulting therefrom has in most instances been without sufficient inherent strength, and in other instances it has failed to unite sufficiently with the parts to be soldered. In other instances it has been subject to oxidation when subjected to water so as to rapidly deteriorate, and in other instances it has been subject to electrolysis or chemical action so as to soon become broken down.

It is therefore the principal object of my invention to produce a soldering alloy which practically overcomes these objections to solders heretofore made.

The following is a description of a soldering alloy embodying my invention and the manner of producing and using the same.

My improved soldering alloy when produced contains copper to the amount of approximately fifteen per cent, tin to the amount of approximately eighty per cent, zinc to the amount of approximately five per cent, and sodium hydroxide (NaOH) to the amount of approximately five per cent of the other elements.

My improved soldering alloy is prepared by first placing the copper, tin and sodium hydroxide in the amounts above specified together with powdered charcoal in a crucible of suitable size and heating these elements, that is, the copper, tin and sodium hydroxide, until they are completely fused, at which time the charcoal floats to the top of the mixture, forming a coating or covering for preventing the fumes of sodium hydroxide from escaping. The charcoal covering in the preparation of my soldering alloy in addition to preventing the sodium hydroxide fumes from escaping prevents the oxygen of the air from coming in contact with the mixture so as to avoid or prevent oxidation. The principal function of the sodium hydroxide is to form a more complete union of elements than could otherwise be obtained. Another important function that the sodium hydroxide performs is that when the solder is remelted for use it flows in a manner which more readily facilitates the operation of brazing or soldering the parts to be joined together. The sodium hydroxide also performs the further function of more completely and permanently uniting the elements together and producing an alloy which is not destroyed or disintegrated by the action of aluminum nor by any chemical action such as oxidation.

When the metals and the sodium hydroxide above described have been completely united the zinc is placed into a crucible and thoroughly mixed with the other elements after which the alloy is poured into a mold or a mechanical device which forms it into elongated bars for use.

It will of course be understood that the zinc is not to be placed in with the other elements until there is a thorough fusing or union of the copper, tin and sodium hydroxide, because if this is done the usefulness of the sodium hydroxide will be destroyed by the zinc.

This alloy has an affinity for metals without the use of a flux as it contains its own flux. It will not oxidize when cooled nor will it oxidize under the heat used while being applied or in the presence of water. As will be evident to those skilled in the art my invention permits of various modifications without departing from the spirit and scope of the invention as expressed in the following claims.

What I claim as my invention and desire to secure by Letters Patent is:

1. The herein described method of making an aluminum solder of copper and tin, consisting of fusing the two metals with sodium and then introducing zinc into the fused elements, substantially as described.

2. The herein described method of making an aluminum solder of copper and tin consisting of fusing the two metals with sodium completely uniting these elements and then introducing zinc with the fused element substantially as described.

3. The herein described method of making an aluminum solder of copper, tin and sodium by fusing these elements and placing a charcoal covering over the fused alloy and introducing zinc substantially as described.

4. A soldering alloy consisting of copper, fifteen per cent, tin, eighty per cent, zinc, five per cent and sodium five per cent of the total of the other elements.

5. A soldering alloy consisting of a major portion of tin, a minor portion of copper, and equal portions of zinc and sodium the total quantity of which is slightly less than the portion of copper.

In testimony whereof I have signed my name to this specification, on this 24th day of April A. D. 1925.

EPHRAIM D. SCHWALM.